(12) United States Patent
Zhang et al.

(10) Patent No.: US 6,993,074 B2
(45) Date of Patent: Jan. 31, 2006

(54) METHODS AND ARRANGEMENTS FOR HANDLING CONCENTRIC MOSAIC IMAGE DATA

(75) Inventors: Cha Zhang, Pittsburgh, PA (US); Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 09/812,713

(22) Filed: Mar. 19, 2001

(65) Prior Publication Data

US 2001/0050955 A1    Dec. 13, 2001

Related U.S. Application Data

(63) Continuation-in-part of application No. 09/535,059, filed on Mar. 24, 2000.

(60) Provisional application No. 60/206,991, filed on May 24, 2000, provisional application No. 60/193,071, filed on Mar. 24, 2000.

(51) Int. Cl.
     *H04N 7/18*   (2006.01)
(52) U.S. Cl. .............................. 375/240.11; 375/240.12
(58) Field of Classification Search ............ 348/42–62, 348/36–39; 375/240.02–240.29; 345/411–433, 345/415–435
     See application file for complete search history.

(56) References Cited

U.S. PATENT DOCUMENTS

| | | | | |
|---|---|---|---|---|
| 6,028,608 | A * | 2/2000 | Jenkins ........................ | 345/619 |
| 6,222,937 | B1 | 4/2001 | Cohen et al. | |
| 6,476,805 | B1 * | 11/2002 | Shum et al. ................ | 345/420 |
| 6,487,304 | B1 | 11/2002 | Szeliski | |
| 6,567,081 | B1 * | 5/2003 | Li et al. ...................... | 345/419 |
| 6,583,787 | B1 * | 6/2003 | Pfister et al. ................ | 345/441 |
| 6,593,925 | B1 * | 7/2003 | Hakura et al. ............... | 345/426 |
| 6,639,596 | B1 * | 10/2003 | Shum et al. ................. | 345/427 |
| 6,677,957 | B2 * | 1/2004 | Grzeszczuk et al. ........ | 345/582 |
| 6,693,964 | B1 | 2/2004 | Zhang et al. | |
| 6,697,062 | B1 * | 2/2004 | Cabral et al. ............... | 345/419 |
| 6,750,860 | B1 * | 6/2004 | Shum et al. ................. | 345/419 |

OTHER PUBLICATIONS

Shum, Heung-Yeung et al., "Rendering with Concentric Mosiacs," Proceedings of the ACM SIGGRAPH Conference on computer graphics, Aug. 1999, pp. 299-306.

Levoy, Marc et al., "Light Field Rendering," Proceedings of the ACM SIGGRAPH Conference on computer graphics, Aug. 1996, pp. 31-42.

(Continued)

*Primary Examiner*—Andy Rao
(74) *Attorney, Agent, or Firm*—Lee & Hayes, PLLC

(57) ABSTRACT

Methods and arrangements are provided for compressing, transporting and decompressing/rendering concentric mosaic image data. The methods and arrangements compress concentric mosaic image data using reference block coding (RBC) techniques. Such RBC techniques selectively divide each of the frames of the concentric mosaic image data into blocks, and then predictively encodes each of these blocks. Some of the blocks are independently encoded as anchor blocks. Each of the remaining blocks is encoded as a predicted block with motion compensation to the anchor frame. The resulting compressed data file includes indexing information that can be used to selectively, randomly access the compressed data during decompression/rendering. A bitstream can be selectively tailored to provide portions of the compressed data file, as needed, for example, during rendering of a particular user-selected view of the concentric mosaic image scene.

76 Claims, 10 Drawing Sheets

OTHER PUBLICATIONS

McMillan, Leonard et al, "Plenoptic Modeling: An Image-Based Rendering System," Proceedings of the ACM SIGGRAPH conference on computer graphics, Aug. 1995, pp. 39-46.

Gortler, Steven J. et al., "The Lumigraph," Proceedings of the ACM SIGGRAPH Conference on computer graphics, Aug. 1996, pp. 43-52.

* cited by examiner

| Approach \ Scene | Lobby (0.2 bpp) | Lobby (0.4 bpp) | Kids (0.2 bpp) | Kids (0.4 bpp) |
|---|---|---|---|---|
| MPEG-2 (dB) | 32.2 | 34.8 | 30.1 | 31.9 |
| RBC (dB) | 32.7 | 36.1 | 31.5 | 33.6 |

Fig. 8

| Mode/Algorithm \ Rendering setting | | 800 x 372 pixels | | 352 x 168 pixels | |
|---|---|---|---|---|---|
| | | PS (fps) | BI (fps) | PS (fps) | BI (fps) |
| Rotational Motion | VQ | 17.6 | 14.6 | 76.9 | 47.6 |
| | RBC | 16.1 | 13.2 | 53.4 | 37.9 |
| Forward Motion | VQ | 17.0 | 14.2 | 71.4 | 45.5 |
| | RBC | 15.7 | 13.2 | 51.6 | 38.0 |
| Sidestep Motion | VQ | 15.8 | 13.2 | 53.4 | 37.1 |
| | RBC | 11.3 | 9.9 | 22.7 | 19.3 |

Fig. 9

METHODS AND ARRANGEMENTS FOR HANDLING CONCENTRIC MOSAIC IMAGE DATA

RELATED PATENT APPLICATIONS

This non-provisional utility application is based on provisional U.S. Patent Application Ser. No. 60/193,071, filed on Mar. 24, 2000, entitled "Compression of Concentric Mosaics Scenery with Reference Block Coding", which is incorporated by reference herein, and to which priority is hereby claimed.

This non-provisional utility application is further based on provisional U.S. Patent Application Ser. No. 60/206,991, filed on May 24, 2000, entitled "Wander In A Realistic Environment Over The Internet", which is also incorporated by reference herein, and to which further priority is hereby claimed.

This non-provisional utility application is also a continuation-in-part of non-provisional application Ser. No. 09/535,059, filed on Mar. 24, 2000, now U.S. Pat. No. 6,693,964, entitled "Methods And Arrangements For Compressing Image Based Rendering Data Using Multiple Reference Frame Prediction Techniques That Support Just-In-Time Rendering Of An Image", which is hereby incorporated by reference herein, and to which further priority is hereby claimed.

TECHNICAL FIELD

This invention relates generally to computers and, more particularly, to methods and arrangements that can be implemented to compress concentric mosaic image information, transport the compressed information, and subsequently provide selective and/or just in time (JIT) rendering of a scene using at least a portion of the compressed information.

BACKGROUND

There is a continuing interest, within the computer graphics community, in image-based rendering (IBR) systems. These systems are fundamentally different from traditional geometry-based rendering systems, in that the underlying information (i.e., data representation) is composed of a set of photometric observations (e.g., digitized images/photographs) rather than being either mathematical descriptions of boundary regions or discretely sampled space functions.

An IBR system uses the set of photometric observations to generate or render different views of the environment and/or object(s) recorded therein. There are several advantages to this approach. First, the display algorithms for IBR systems tend to be less complex and may therefore be used to support real-time rendering in certain situations. Secondly, the amount of processing required to view a scene is independent of the scene's complexity. Thirdly, the final rendered image may include both real photometric objects and virtual objects.

IBR systems can be complex, however, depending upon the level of detail required and the processing time constraints. For example, Adelson et al., in their article entitled "The Plenoptic Function And The Elements Of Early Vision", published in Computational Models of Visual Processing by The MIT Press, Cambridge, Mass. 1991, stated that a 7-dimensional plenoptic function can be implemented in an IBR system to completely represent a 3-dimensional dynamic scene. The 7-dimensional plenoptic function is generated by observing and recording the intensity of light rays passing through every space location as seen in every possible direction, for every wavelength, and at any time. Thus, imagine an idealized camera that can be placed at any point in space $(V_x, V_y, V_z)$. This idealized camera can then be used to select any of the viewable rays by choosing an azimuth angle ($\theta$) and elevation angle ($\phi$), as well as a band of wavelengths ($\lambda$). Adding an additional parameter (t) for time produces a 7-dimensional plenoptic function:

$$p=P(\theta, \phi, \lambda, V_x, V_y, V_z, t)$$

Thus, given function p, to generate a view from a specific point in a particular direction, one need only to merely plug-in the values for $(V_x, V_y, V_z)$ and select from a range of $(\theta, \phi)$ for some constant t for each desired a band of wavelengths ($\lambda$).

Accomplishing this in real-time, especially for a full spherical map or a large portion thereof, is typically beyond most computer's processing capability. Thus, there has been a need to reduce the complexity of such an IBR system to make it more practical.

By ignoring the time (t) and the wavelength ($\lambda$) parameters, McMillan and Bishop in their article entitled "Plenoptic Modeling: An Image-Based Rendering System" published in Computer Graphics (SIGGRAPH'95) August 1995, disclosed a plenoptic modeling scheme that generates a continuous 5-dimensional plenoptic function from a set of discrete samples.

Further research and development by Gortler et al. led to the development of the Lumigraph as disclosed in an article entitled "The Lumigraph" that was published in Computer Graphics (SIGGRAPH'96) in August, 1996. Similarly, Levoy et al. developed a Lightfield as disclosed in an article entitled "Light Field Rendering" that was also published in Computer Graphics (SIGGRAPH'96) in August of 1996.

The Lumigraph and the Lightfield presented a clever 4-dimensional parameterization of the plenoptic function provided the object (or conversely the camera view) is constrained, for example, within a bounding box. As used herein, the term "Lumigraph" is used generically to refer to Lumigraph, Lightfield, and other like applicable plenoptic function based techniques.

By placing the object in its bounding box (e.g., a six-sided cube) which is surrounded by a larger box (e.g., a larger six-sided cube), the Lumigraph indexes all possible light rays from the object through the coordinates that the rays enter and exit one of the parallel planes of the double bounding boxes. Thus, in the case of a six-sided cube, the resulting Lumigraph data is thus composed of six 4-dimensional functions that can be discretized more precisely for the inner bounding box closest to the object, and more coarsely for the outer bounding box.

Even though many IBR scenes are synthetic, it is possible to capture the Lumigraph/Lightfield of a realistic scene/objects. There are some technical challenges, however, e.g., maintaining motion control of the camera array so that pictures can be taken from regular grid points of a plane parallel to the image plane.

In "Rendering With Concentric Mosaics", Computer Graphics (SIGGRAPH'96), pp. 31, August 1996, Shum et al. proposed the use of concentric mosaics, which employ a 3D plenoptic function that restricts viewer movement inside a planar circle and looking outwardly.

A concentric mosaic scene can be constructed very easily, for example, by rotating a single camera at the end of a horizontal beam with the camera pointing outwardly and shooting images as the beam rotates. At the time of the rendering, one can then just split the view into vertical ray slits and reconstruct each slit through similar slits captured during the rotation of the camera.

Compared with a top-notch graphic rendering algorithm, such as, e.g., ray tracing, concentric mosaic techniques can render a scene realistically and also fast, regardless of the complexity of the scene. Unfortunately, the amount of data required for such concentric mosaic techniques is significantly large. By way of example, certain exemplary concentric mosaic scenes include 1,351 frames, each of which have a resolution of 320×240 pixels; thereby occupying a total of about 297 megabytes. Hence, the use of data compression is essential in concentric mosaics.

Thus, there is a need for methods and arrangements that can provide sufficiently large enough compression ratios, because of the amount of data. Fortunately, as a result of the image capturing techniques, for example, there is typically a high correlation within the resulting 3D dataset of the concentric mosaics.

Preferably, the methods and arrangements will allow for the rendering of a portion of the concentric mosaics without requiring the entire 3D dataset. In fact, each time a view is rendered it would be beneficial if only a small portion of the 3D dataset is used by the rendering mechanism.

Further, to save on system costs it would also be useful for the methods and arrangements to reduce the amount of memory used in rendering the concentric mosaics.

For example, a well designed concentric mosaic codec that allows portions of the 3D dataset to be randomly accessed and decoded from a compressed concentric mosaic bitstream would be useful. Such methods and arrangements could provide just-in-time (JIT) rendering; e.g., where only the content needed for the rendering of a current view is processed. Preferably, the JIT rendering techniques should be reasonably fast enough for use with conventional computing systems and like devices.

In the past, a spatial domain vector quantization (SVQ) has been proposed to compress concentric mosaics. See, e.g., Shum et al., supra. Some of the advantages of SVQ are that the bitstream compressed by SVQ can be decoded relatively fast, and the compressed SVQ index is easily accessible at arbitrary locations. However, SVQ is complex at the encoding stage. Furthermore, the compression ratio of SVQ is relatively low. For example, the SVQ proposed by Shum et al., supra, only achieves a compression ratio of about 12:1.

One may also compress each individual shot of the concentric mosaics using baseline JPEG or JPEG 2000 techniques. Because correlation between multiple shots is not used, however, the use of a still image coder may not be the most efficient. Moreover, during the rendering of new views, the concentric mosaic 3D dataset is accessed by slits rather than images. As such, a bit stream formed by the concatenation of individual compressed images may not be very efficient to access.

Video-based codecs such as those used by MPEG techniques provide another possible choice for use in compressing concentric mosaics. See, e.g., Mitchell et al., "MPEG Video: Compression Standard", Chapman & Hall, 1996.

MPEG typically achieves a very high compression ratio by exploring the redundancy in neighboring frames. However, an MPEG decoder is designed to access the compressed images sequentially and does not support random access. Consequently, MPEG techniques may not be practical for use with concentric mosaics.

A 3D wavelet approach has also been proposed for the compression of the concentric mosaics. See, e.g., co-pending U.S. patent application Ser. No. 09/535,059, filed on Mar. 24, 2000, entitled "Methods And Arrangements For Compressing Image Based Rendering Data Using Multiple Reference Frame Prediction Techniques That Support Just-In-Time Rendering Of An Image", now U.S. Pat, No. 6,693,964.

The 3D wavelet algorithm achieves a good compression ratio. The 3D wavelet algorithm also provides the ability to access a portion(s) of the compressed bitstream, but perhaps with an initial reduced resolution and quality. Nevertheless, such resolution and quality scalability capabilities may prove very useful in an Internet or like environment. Unfortunately, while 3D wavelet techniques provide for high compression ratios, these techniques may not be feasible for use in many conventional computers and like devices.

Thus, even though the MPEG and 3D wavelet codecs can achieve good compression efficiency, substantial computation resources must be devoted to decode the concentric mosaic data in real time.

Alternatively, one may attempt to pre-decode the entire bitstream and then render on the resulting decoded dataset. Within a client-server or like environment, however, this technique would probably not be feasible because it tends to introduce significantly long delays at the beginning and also because it would require a substantially large amount of memory in which to hold the entire decoded environment.

Therefore, there is a need for new methods and arrangements that provide good compression performance, yet at the same time enable the view of the environment to be accessed and rendered in real time, with minimum memory support.

SUMMARY

The present invention includes methods and arrangements that provide good compression performance, yet at the same time enable the view of the environment to be accessed and rendered in real time, with reduced memory support. These various methods and arrangements allow for the rendering of a portion of the concentric mosaics without requiring the entire 3D dataset.

In accordance with certain aspects of the present invention, the above-stated needs and others are met by methods and arrangements that compress the concentric mosaic data using a scheme called reference block coding (RBC). For the first time, JIT rendering is realized for highly compressed concentric mosaic scenes with predictive coding across frames. RBC essentially splits the concentric mosaic images into blocks and predictively encodes them. The frame structure of RBC has been designed to improve the compression efficiency and to enable the bitstream to be easily randomly accessed.

For example, in certain implementations of the present invention, two-stage motion estimation is employed in RBC, i.e., global frame motion estimation (GME) with local block motion estimation (LME) as a refinement. Here, the shots or frames of the concentric mosaics are classified into two categories—anchor frames (A frames) and predicted frames (P frames). The anchor frames are encoded independently, while the predicted frames are referred to an anchor frame by motion compensation and predictively encoded. The predicted frames are preferably restricted to only referring to an anchor frame, not another predicted frame. Moreover, a built-in two level index table can be included in the compressed bitstream to provide for easy random access during the subsequent rendering process.

In accordance with certain implementations, a plurality of caches are provided in memory. These caches are designed with a special query structure that avoids decoding content over and over again. The access and decoding speed of such an RBC arrangement has been proven fast enough to power real-time rendering of fairly detailed concentric mosaic captured/generated scenes.

In accordance with certain further aspects of the present invention, both A and P frames can be divided into a plurality of macroblock groups (MBGs), which are the smallest unit for accessing and streaming the compressed concentric mosaic data. A virtual media (Vmedia) access protocol or other like protocol can then be used to deliver bitstream segments of the compressed MBGs over the Internet or other networked communication environment. In certain implementations, for example, Vmedia enables the access, cache and prioritized delivery of fragments of compressed media related to a current view.

In accordance with certain further implementations of the present invention, using RBC and Vmedia or other like protocol, a 3D browser or like tool can be configured, for example, as an ActiveX plug-in, which enables the user to wander in a realistic environment over the Internet or other networked communication environment, even when the connection speed of the network is somewhat slow, e.g., about 33.6 kbps.

BRIEF DESCRIPTION OF THE DRAWINGS

A more complete understanding of the various methods and arrangements of the present invention may be had by reference to the following detailed description when taken in conjunction with the accompanying drawings wherein:

FIG. 8 is a table of experimental results of the compression performance (in dB) of a conventional MPEG-2 encoding scheme versus an exemplary reference block coding (RBC) scheme, in accordance with certain implementations of the present invention.

FIG. 9 is a table of experimental results of the rendering speed (in frames per second (fps)) of a conventional vector quantization scheme versus an exemplary reference block coding (RBC) scheme, in accordance with certain implementations of the present invention.

DETAILED DESCRIPTION

1. An Exemplary Computing Environment

Figure 1:
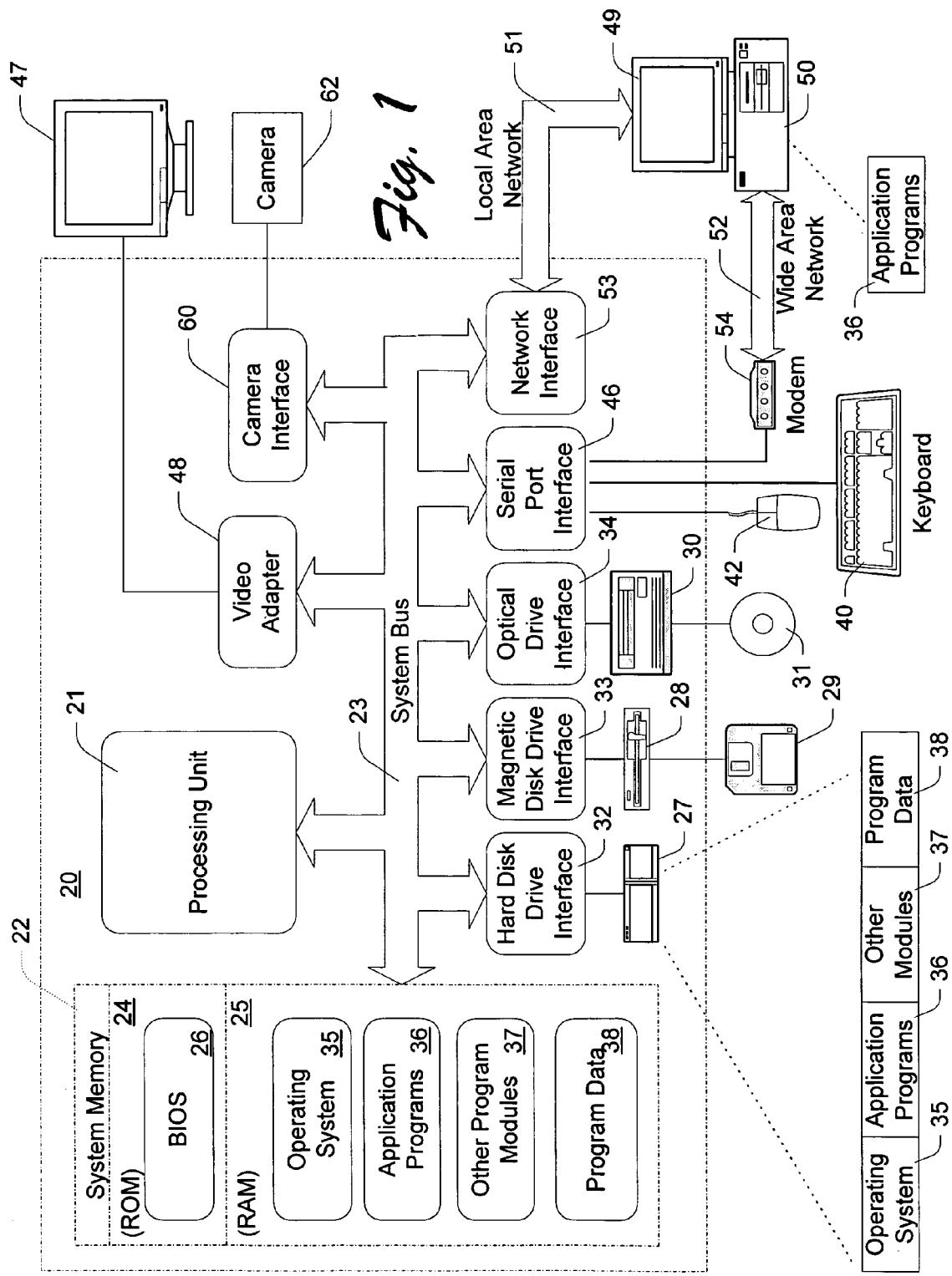
FIG. 1 is a block diagram depicting an exemplary computer system arrangement that can be used to compress image-based rendering (IBR) data, store/transport/receive compressed IBR data, and provide selective/just in time rendering of an image based on at least a portion of the compressed IBR data.

Reference is made to FIG. 1, which is a block diagram depicting an exemplary computer system arrangement that can be used to capture/generate concentric mosaic data, store/transport compressed data, and provide selective/just in time rendering of a current view of the scene using at least a portion of the compressed data. Those skilled in the art will recognize that other arrangements and configurations may also be used for the same purpose.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As further depicted, a camera interface 60 (e.g., a USB interface, IEEE 1394 interface, etc.) is configured to provide connectivity between system bus 23 and a remote camera 62. Camera 62 can be either an analog or digital, and either a still or motion camera, for example, which is operatively configured to capture image data of a scene. In the case of an analog camera, camera interface 60 would likely be further configured to convert the captured analog image information into corresponding digital image information.

2. A Concentric Mosaics Scene

Figure 2A:
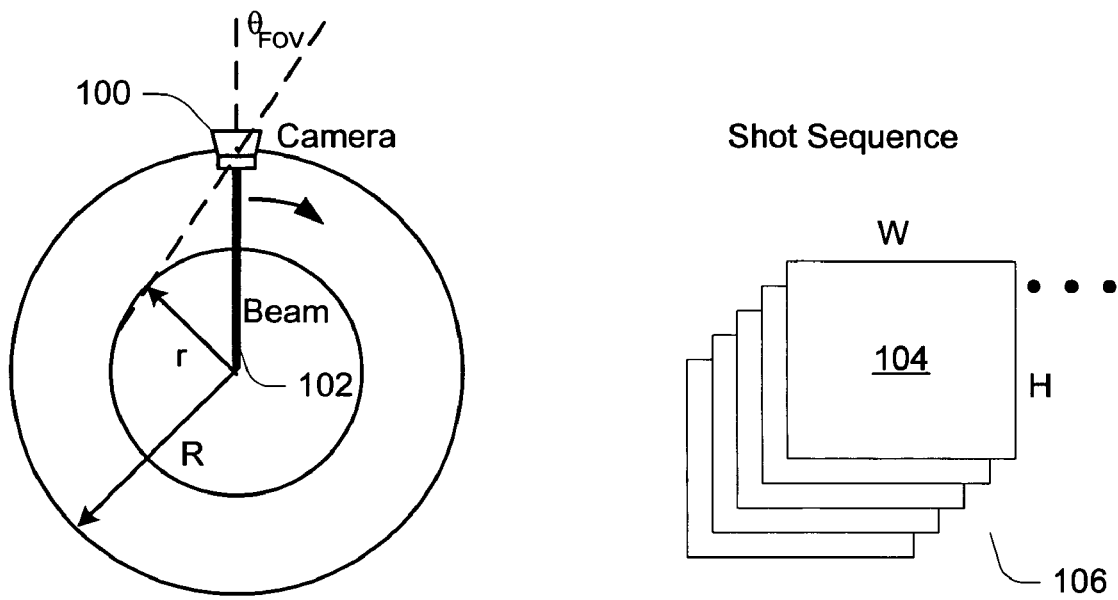
FIGS. 2a–b are illustrative diagrams depicting methods and arrangements for capturing and rendering concentric mosaic image data, respectively, in accordance with certain exemplary implementations of the present invention.

A concentric mosaics scene can be captured by mounting a camera 100 at the end of a rotating beam 102, and shooting images 104 at regular intervals as the beam 102 rotates, as illustrated in FIG. 2a.

The data of the concentric mosaic is a shot sequence 106, which can be denoted as c(n,w,h), where n indexes the camera shot, w and h represent the horizontal and vertical position of each ray within a shot, respectively. Let N be the total number of shots during the three hundred and sixty degrees of rotation of camera 100, W and H be the width and the height of each shot. In certain exemplary implementations, N is set to between about 900 and about 1500, which means that the rotation of the camera is very slow, typically at an angular speed of 0.4 to 0.24 degrees per shot. For a typical realistic environment with large depth variation, 900 to 1500 shots have to be captured in a circle to render the scene properly without alias. Note that with the concentric mosaics, no 3D or depth information of the scene is needed to render a novel view of the environment.

Let R be the length of the beam 102, $\theta_{FOV}$ be half of the horizontal field of view (FOV) of the camera 100, as shown in FIG. 2a. The captured concentric mosaics can render an arbitrary view pointing to any direction within a smaller circle of the radius $r = R \sin \theta_{FOV}$.

Figure 2B:
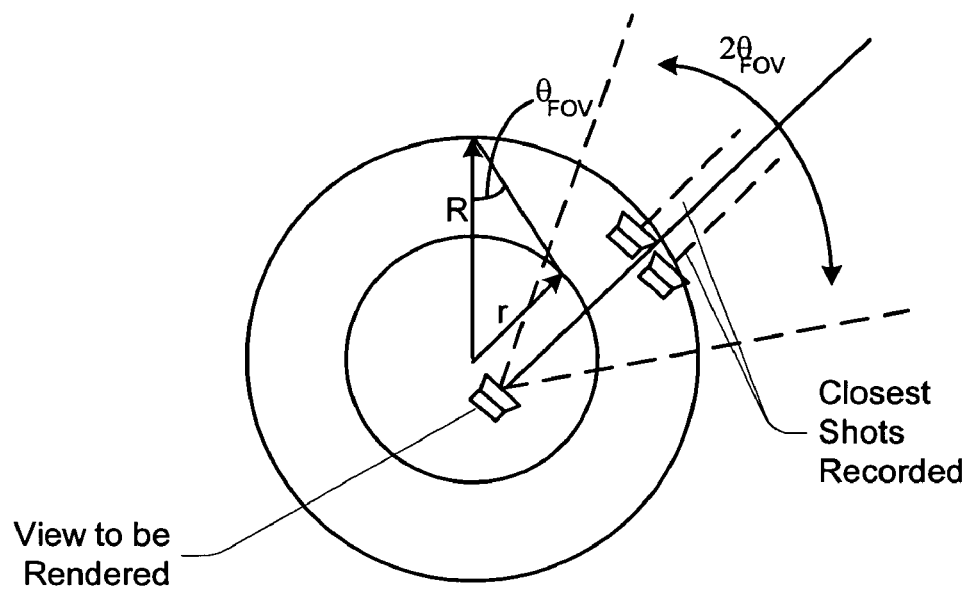

FIG. 2b shows an example of rendering a novel view inside the circle. The view is first split into multiple vertical slits, and each slit passes through the outer circle where the camera is located. The closest two shots (e.g., left and right) are then picked to render the current slit. Here, there are two modes of rendering, point sampling (PS) and bilinear interpolation (BI). The rendering speed of the PS mode tends to be much faster than that of the BI mode.

Thus, for example, in accordance with certain exemplary implementations, let P be a novel viewpoint, AB be the field of view to be rendered and PV be a rendered slit. During rendering, one need simply search for the slit P'V in the captured dataset, where P' is the intersection between ray PV and the camera path. Here, the rays P'V and PV look in the same direction. Therefore, what is rendered at PV can be recovered from what is observed in P'V. In fact, ray slit PV is a vertical scaled version of P'V, where the vertical scaling is necessary for depth correction. For further details on the subject, please refer to Shum et al., supra.

According to Shum et al., the shot sequence is rearranged into concentric mosaic images, where each image is the combination of vertical slits with the same w. However, as will be seen, such rearrangement is not necessary for either the compression or the rendering of the concentric mosaics. For example, in certain implementations of the reference block coder (RBC) described herein, the original shot sequence is used for compressing and accessing the data.

Since the concentric mosaics consist of a discrete number of shots, and each shot consists of a discrete number of vertical slits, there may not be an exact slit P'V in the dataset. Let the four slits closest to P'V be $P_1V_{11}$, $P_1V_{12}$, $P_2V_{21}$, and $P_2V_{22}$ where $P_1$ and $P_2$ are the two captured shots on the two sides of the intersection point P' along the camera path, $P_1V_{11}$ and $P_1V_{12}$ are the two slits on the two sides of ray $P_1V$ in shot $P_1$, and $P_2V_{21}$ and $P_2V_{22}$ are the two slits beside $P_2V$ in shot $P_2$. One may bilinearly interpolate the four slits to get the content of P'V (BI mode), or, if due to complexity and/or network bandwidth constraints, for example, one may use the one slit closest to P'V to represent it (PS mode). In either case, the content of the slit P'V is recovered, which is then used to render slit PV in the rendered view.

A slit can be rendered as long as the referred slits, i.e., the four slits in the bilinear interpolation mode or the closest one slit in the point sampling mode, are available. A view can be rendered when all the slits referred in the view are available.

Thus, from FIG. 2b, one can see that when rendering a new view from a "virtual camera" at any position, only the shots within the horizontal field of view of the camera are involved. Moreover, even for the shots within the field of view, only a small portion of the vertical slits pointing to the direction of the rendered slits need to be known, and the size of the portion is inversely proportional to the distance between the camera and the related arc of the outer circle.

This characteristic makes it important and urgent for random access to a cluster of vertical slits. In certain exemplary RBC approaches described herein, for example, sixteen vertical slits are grouped into an elementary unit, and accessed once together. A more detailed description is provided below.

3. Reference Block Coding

Figure 3:
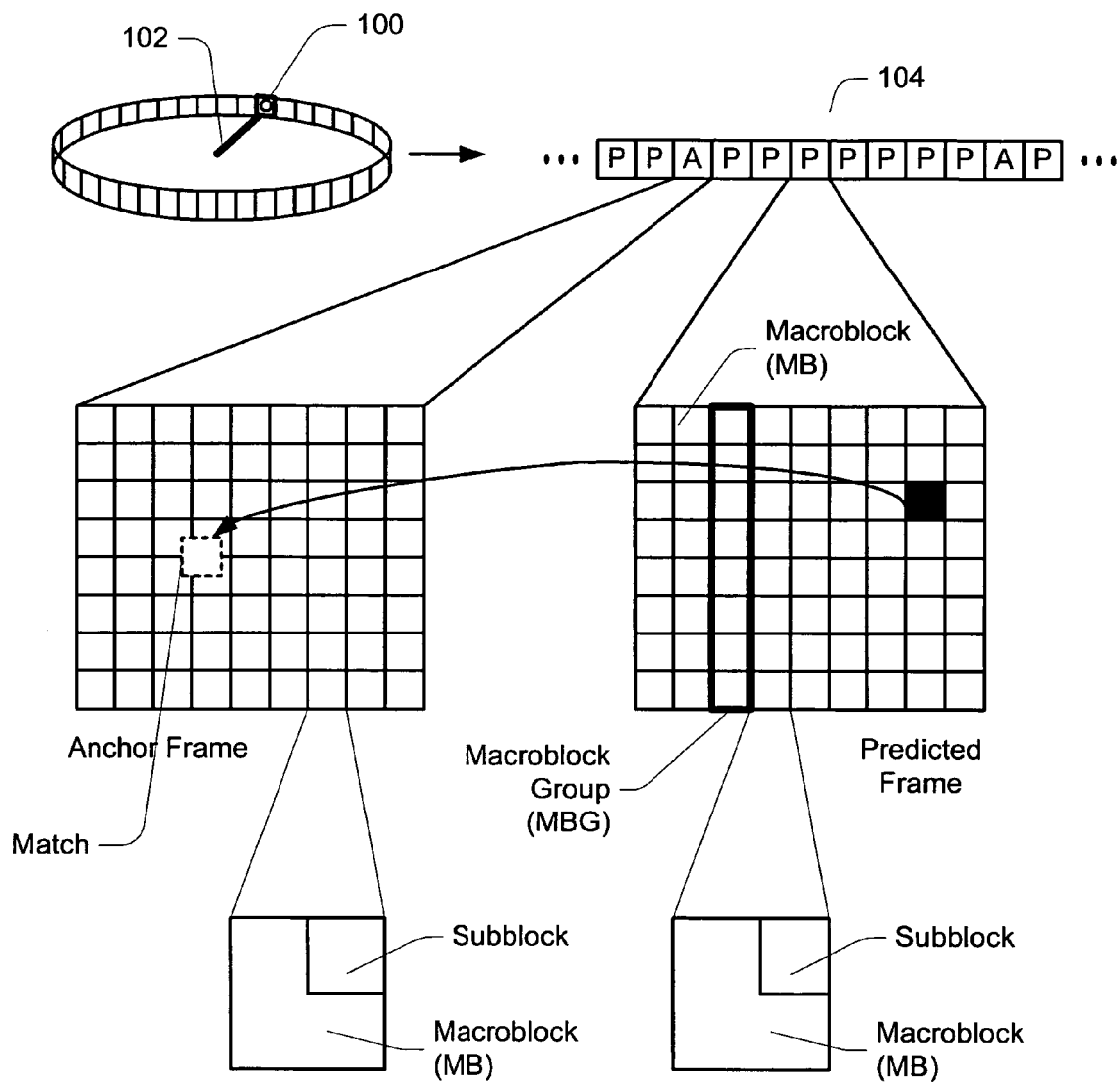
FIG. 3 is an diagram illustratively depicting methods and arrangements for capturing/generating concentric mosaic image data, arranging selected portions of the concentric mosaic image data as either anchor portions or predicted portions, and selectively associating each of the predicted portions to an anchor portion, in accordance with certain exemplary implementations of the present invention.

An exemplary data structure of the reference block coding (RBC) is illustrated in FIG. 3. Here, the resulting concentric mosaic images 104 are divided into two categories, anchor (A) frames and predicted (P) frames. The A frames are distributed uniformly across the concentric mosaic images and provide the anchor of access for the decoding operation. The A frames are encoded independently, while the P frames are predictively encoded with reference to the two nearby A frames.

Let D be the ratio of P frames to A frames. The smaller the value of D is, the more A frames there are, and the easier the random access becomes. However, the compression efficiency will suffer as the correlation between neighboring shots is not fully utilized. In certain exemplary implementations, D is set to be 7, i.e., one out of eight frames is an A frame.

In this example, both A frames and P frames are further segmented into square blocks of size 16×16 pixels. Each of these blocks is referred to as a macroblock (MB), based on their partial similarity with macroblocks used in JPEG and MPEG. All MBs at the same vertical position of a shot are grouped together and form a macroblock group (MBG), which is the smallest unit of accessing and decoding data. Here, the width of the MBG is basically a compromise between access granularity and coding efficiency.

By way of example, let the concentric mosaics consist of 1440 shots with resolution 320×240 pixels. Let the field of view (FOV) of camera 100 be 40 degrees for both capturing and rendering, i.e., $\theta_{FOV}$=20°. A rendering engine accesses the concentric mosaic scene by slit, i.e., vertical image ray. If the camera of the view to be rendered is at the center of the concentric mosaics, the number of shots covered by the FOV will be 1440/360×40=160. If the rendering engine is in PS mode, then, on average, about two vertical slits are accessed in each shot. If the rendering engine is in BI mode, then about three to four slits are accessed per shot. When the camera goes away from the center, more slits will be accessed from each individual shot.

Without consideration of the coding efficiency, an access granularity of one slit is the optimum choice. However, research tends to show that images correlate better over about twenty neighboring pixels. See, e.g., Mitchell et al., supra. Thus, coding the image slit by slit will probably not be efficient in compression.

Consequently, in accordance with certain exemplary implementations of the present invention, clusters of sixteen vertical slits are used to form a MBG that can be accessed and decoded together. Though redundant slits are accessed for an individual view, the rendering speed will usually be acceptable in interactive wandering due, for example, to the use of cache memory.

Here, the MBs in A frames are independently encoded. Each MB is split into six 8×8 pixel subblocks, with four of these subblocks being luminance subblocks, and the remaining two subblocks being chrominance subblocks, which are sub-sampled by a factor of 2 in both the horizontal and vertical directions.

In this exemplary implementation, the subblocks are transformed by a basis-8 discrete cosine transform (DCT), quantized by an intra Q-table with a quantization scale $Q_A$, and then entropy encoded by a run-level Huffman coder with an A frame Huffman table. The resulting compressed bitstreams of all MBs belonging to the same A frame MBG are then grouped together into one bitstream.

MBs in the P frames are predictively encoded with reference to a nearby A frame. In this example, the P frame may refer to two nearby A frames, however, for a single MB in the P frame, it only refers to one of the two. In fact, all MBs in a single MBG are preferably required to refer to the same A frame. This restriction tends to further reduce the amount of accessed data when a slit in the P frame MBG is accessed.

Since the concentric mosaic images in this example were created by swinging a single camera mounting on a beam, the motion between two concentric mosaic images is predominantly horizontal translation, with little to none vertical motion. A two-stage motion estimation, which includes global translation motion and local refinement motion, is then applied to calculate the motion vector of each MB. The camera motion between shots is modeled by one or more global horizontal translation motion vectors.

In this example, more complex models, such as, e.g., affine or perspective models, were not used because the camera only moves in very small intervals between shots with dominant translation motion. Thus, a more complex motion model would typically not be justified, especially for use with conventional computers. Nevertheless, it is recognized that other motion models may be used.

Continuing with the above example, the dominant global horizontal translation vectors $mv_1$ and $mv_2$ of the P frame with regard to the two referring A frames are calculated and recorded. The vector mv are used to reduce the search range and the entropy of the P frame MB motion vector. Here, for example, the individual refinement motion vector of the P frame MB can be restricted to about +/−5 pixels of the global translation vector mv with half pixel accuracy, because most MBs just move along the underlying P frame. In fact, most of the local refinement motion vectors of the P frame MBs are zeros.

To encode a P frame MBG, the MBG is encoded against both reference A frames. The MBG is split into a number of MBs. For each MB, its best match is searched in the two reference A frames. Note that, in this example, a match may not be co-located with any A frame MB. It may cover as many as four MBs, as shown in FIG. 3. Since the search is restricted, this can typically be performed very fast. The prediction residue of the MB is then split into six subblocks, with each subblock transformed by a basis-8 DCT, quantized by scale Qp, and then run-level Huffman coded with a P frame Huffman table.

After all the MBs in the MBG are encoded, the rate and distortion of MB codings with reference to the two nearby A frames are compared. The one that offers a better rate-distortion trade off is selected as the reference frame for the MBG. One bit is encoded for each MBG to identify the reference A frame. After that, the motion vector and the prediction residue of the MBs are grouped together and encoded.

In the above example, one bit is encoded for each MBG to identify the reference A frame. This reference identification bit, the compressed motion vector and the prediction residue of the MBs form the compressed bitstream of MBG.

Figure 4:
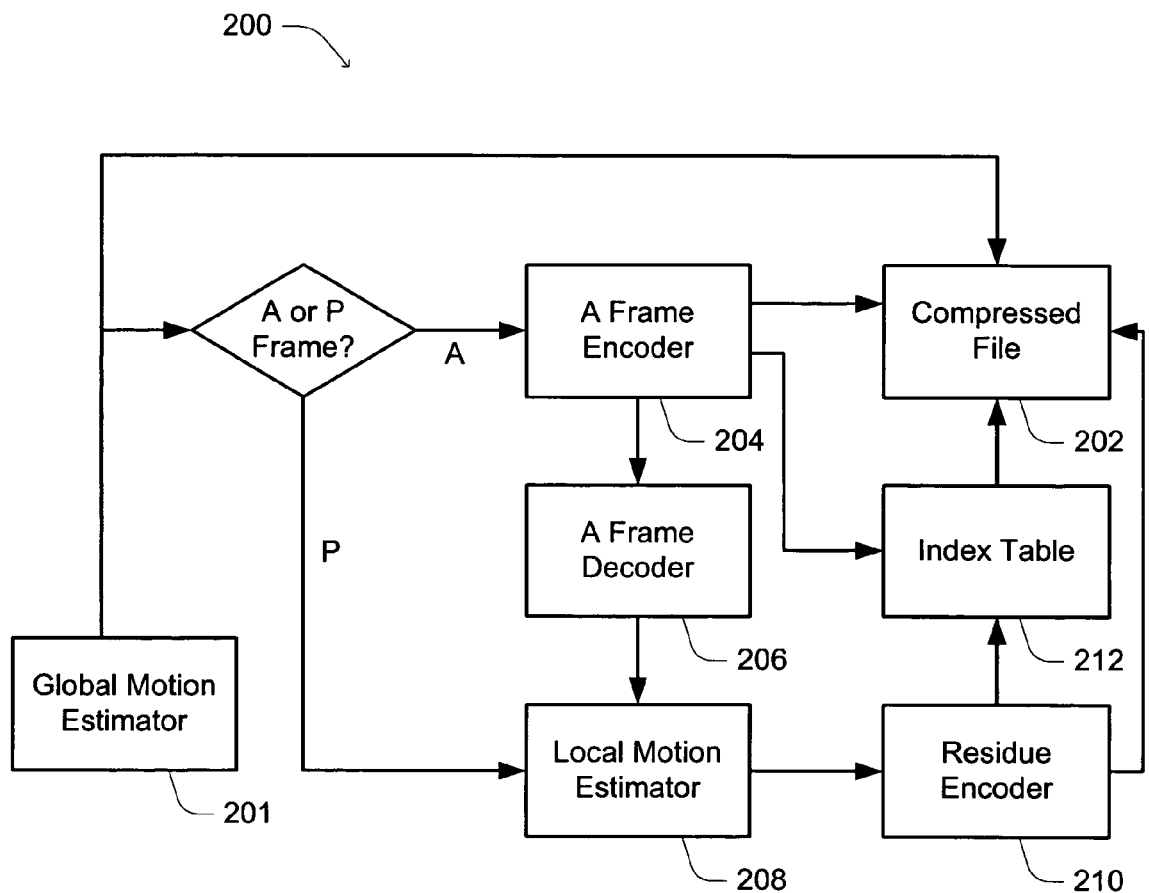
FIG. 4 is a block diagram depicting methods and arrangements for associatively encoding anchor and predicted portions of the concentric mosaic image data and producing a resulting bitstream, in accordance with certain exemplary implementations of the present invention.

A block diagram of an exemplary RBC encoding process 200 is shown in FIG. 4. The result of this process is a compressed file 202.

Given a concentric mosaics scene, the global translation vector (in block 201) of each P frame is calculated and encoded with differential pulse code modulation (DPCM) and a Huffman or another like process. After that, all A frames are encoded, e.g., as previously described. Note that the A frames are encoded (in block 204) and then decoded immediately (in block 206) and used as references for local motion compensation (in block 208), because any subsequent decoder will only have access to decoded A frames, not the original ones.

The P frames are then encoded (in block 208), with each MB predicted and its residue encoded/compressed (in block 210), e.g., as previously described. Typically, it takes more bits to encode an A frame than a P frame, because the entropy of the A frame is much higher than that of the residue of the P frame.

This RBC approach is basically balanced between the need for compression efficiency and fast decoding. The basic data access unit of the RBC is the MBG, which is preferably larger than the slit which is the access unit of the rendering engine. Therefore, redundant slits are accessed and decoded for the rendering of an individual view. Nevertheless, grouping slits into MGBs greatly improves the compression efficiency and reduces the percentage of the overhead required by the basic access unit, such as the bitstream index, motion vector, etc. It causes fewer bits to be delivered for the rendering of the current view.

In block 212, indexing information is collected/generated and provided along with the encoded/compressed image data to form compressed file 202. Compressed file 202 can then be transported or otherwise provided to the decoding/rendering processes as a bitstream.

Figure 5:
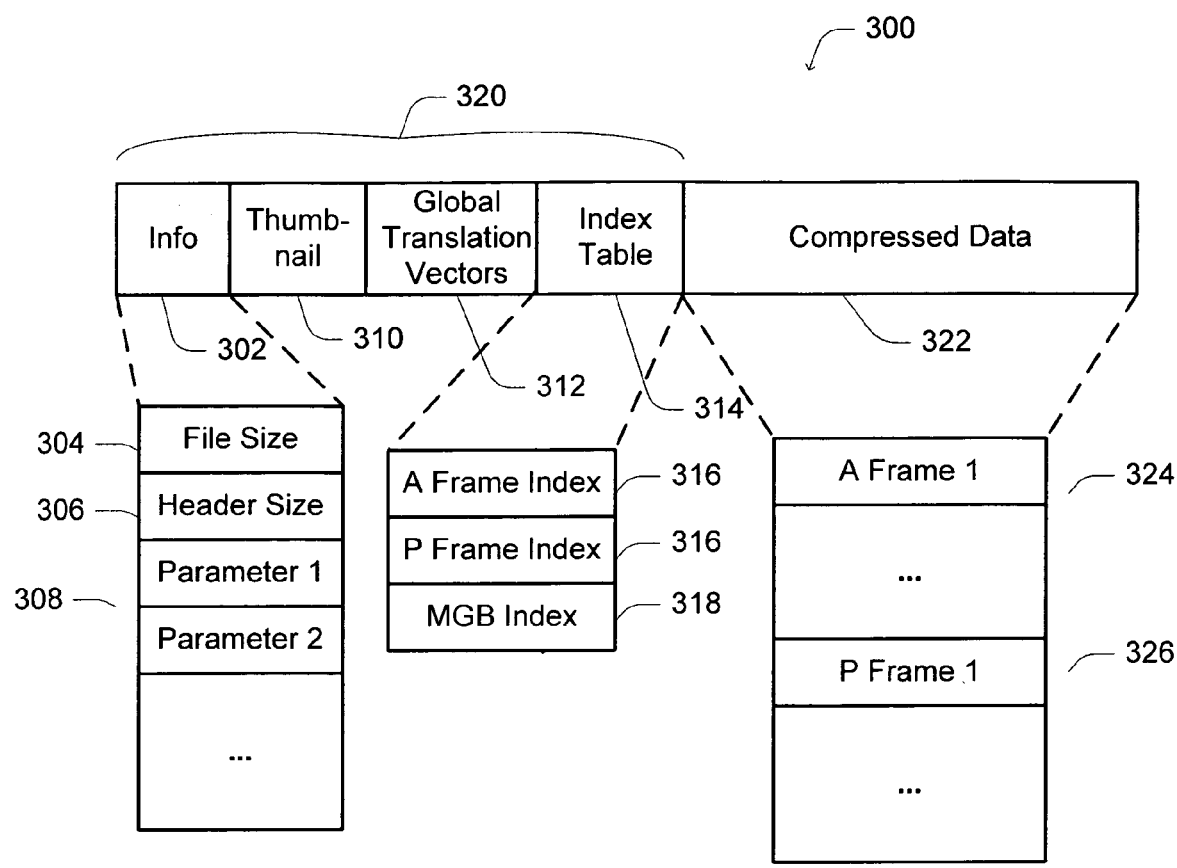
FIG. 5 is a diagram illustratively depicting a part of one form of an exemplary bitstream carrying encoded/compressed anchor and predicted portions of the concentric mosaic image data and related two-stage indexing information, in accordance with certain implementations of the present invention.

An exemplary resulting bitstream syntax of RBC compressed concentric mosaic can be indexed by a two-level hierarchical index table, as illustrated in FIG. 5.

The compressed bitstream 300 of RBC processed data is organized with an index structure so that an arbitrary MBG may be easily accessed and decoded. As shown in FIG. 5, bitstream 300 is lead by an information header 302, which includes crucial information of the concentric mosaic scene, such as, for example, the size of the scene 304, the header size 306, the coding and rendering parameters 308, etc. After information header 302, a thumbnail 310 of the environment map, for example, of the captured concentric mosaics scene can be included. Thumbnail 310, for example, may be compressed as an anchor frame, and used to provide a quick overview of the whole environment to the user.

After thumbnail 310, the compressed bitstream 300 includes the global translation vectors 312 of P frames and a two-level index table 314, which records the encoded bitstream length of each A and P frame in a first-level index 316 and that of each MBG in a second-level index 318.

Information header 302, (optional) thumbnail 310, compressed global translation vectors 312 and two-level hierarchical index table 314 are included in a file header 320 of compressed concentric mosaic bitstream 300. The size of file header 320 is usually trivial; it typically occupies only about 1–2% of bitstream 300. In accordance with certain implementations of the present invention, file header 320 must be downloaded before any browsing of the environment can be performed. Hence, two-level index table 314 is loaded into the memory whenever the concentric mosaics scene is to be accessed.

Following file header 320, is the compressed data 322, which includes a plurality of A frame data 324 and P frame data 326.

The RBC coding scheme bears slight resemblance to MPEG. In fact, the MB of an A frame and the MB prediction residue of a P frame can be encoded exactly the same way as those in MPEG. However, RBC has a very different frame structure, motion model, and bitstream syntax from that of MPEG.

In contrast to MPEG, which is a general-purpose video codec, the RBC in this example is tuned specifically for the compression of the concentric mosaics. Unlike MPEG, where a predicted P frame can refer to another predicted P frame, the P frame in RBC only refers to an A frame. MPEG allows strong motion for each MB, while the motion model in RBC is predominantly global horizontal translation, with only a small local variation for an individual MB. The two-level hierarchical index table 314 is also unique to RBC. These and other features enhance the compression performance of RBC and enable the RBC compressed bitstream to be randomly accessed in the rendering stage.

4. Just-In-Time Rendering

As mentioned earlier, care must usually be taken not to decode the entire compressed concentric mosaic at any time, as the concatenated concentric mosaics can be extremely large. Another preferred requirement for a decoder engine is a relatively low computation load, so that the decoding process does not consume all of the computer resources, as some are also necessary for the rendering and user interaction.

With the two-level indexed structure provided by the above-described RBC techniques, it is possible to access and decode only the data necessary to render the current view. When a user selects a new view of the environment, a series of slit access requests are sent by the rendering engine. It is the task of the decoder engine to provide the slits quickly to the decoder engine. To reduce the computation load of the decoder engine, a number of caches can be provided, so that recently decoded content need not be re-decoded again. One important consideration is to balance between the computation load and memory requirements.

Figure 6:
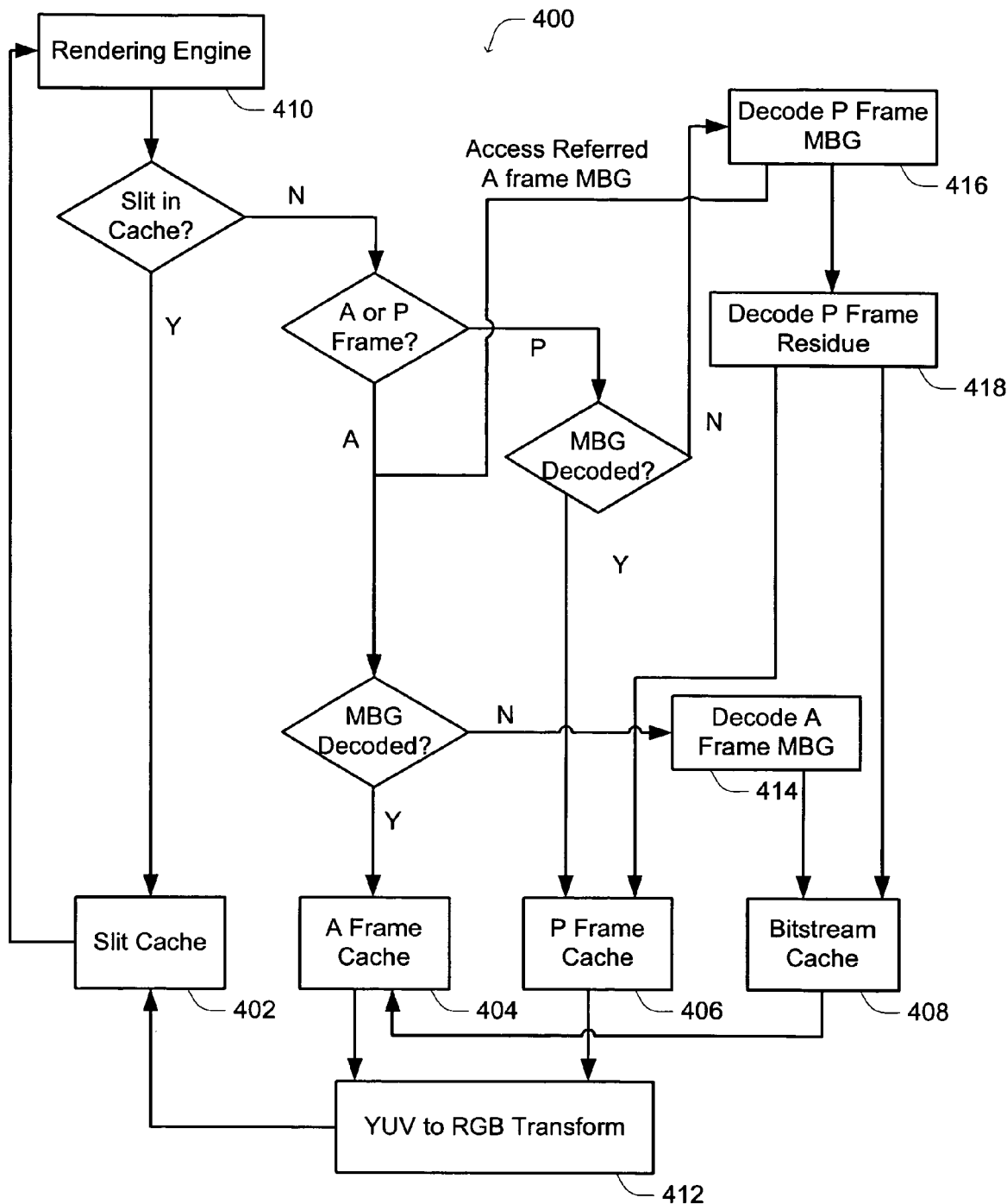
FIG. 6 is a block diagram depicting methods and arrangements for decoding/decompressing and rendering selected anchor and predicted portions of concentric mosaic image data as received in a bitstream using a plurality of caches, in accordance with certain exemplary implementations of the present invention.

An exemplary structure of a rendering/decoding process 400 is depicted in the block diagram in FIG. 6. In this example, there are four caches 402, 404, 406, and 408, which hold the slits (in RGB space), the A and P frame MBGs (in YUV space), and the compressed concentric mosaic bitstream, respectively.

Here, a rendering engine 410 accesses the data by slits. Whenever a slit is not in slit cache 402, it will be further accessed from the A or the P frame cache (404, 406), depending on where the slit is located. Rendering engine 410 checks if the MBG in which the slit is located is in cache. If it is, the accessed slit is converted from YUV to RGB (in block 412), and it will be put in slit cache 402. Otherwise, the corresponding MBG is decoded.

If the MBG belongs to an A frame, it is decoded (block 414) directly from the compressed bitstream with the aid of the two-level index structure. If the MBG belongs to a P frame, a check is first made (in block 416) to see if all the referred A frame MBGs by the P frame MBs are in the A frame cache 404. When needed, a referred A frame MBG will be decoded if it is not in cache 404.

Next, the prediction residue of the P frame MBG is then decoded (block 418), added to the motion compensation, and stored in the P frame cache 406. Here, the compressed bitstream is accessed through bitstream cache 408.

In this example, the slit, A and P frame caches (402, 404 and 406) are managed with a first-in first-out (FIFO) cache management strategy. A doublelink is established for each cache. Whenever a slit/MBG is accessed, the accessed content is moved to the head of the link. Whenever a slit/MBG that is not in cache is decoded, it is also added to the head of the link, and if the memory allocated to the cache is full, the content at the end of the link is dropped.

The memory allocated to each cache should be large enough to cover the rendering of the current view as well as the most common movement of the user. For example, certain implementations require that slit cache 402 and P frame cache 406 be large enough to hold two entire rendered views and that A frame cache 404 hold the referred A frames required for the decoding of P frame MBGs accessed in the current view. Bitstream cache 408, in certain examples, is large enough to hold all of the compressed concentric mosaics.

5. Simulation Results

To demonstrate the effectiveness of an exemplary reference block coder (RBC) scheme, a comparison was made between the compression performance of RBC versus that of MPEG-2. Note, as mentioned earlier, MPEG does not offer random access and is thus not a suitable coding tool for the concentric mosaic rendering. Nevertheless, a popular MPEG-2 coder was used as a benchmark to demonstrate the effectiveness of RBC. In this MPEG-2 example, the first frame was independently encoded as an I frame, and the rest of the frames were predictively encoded as P frames. The test concentric mosaics were scenes of a Lobby and of Kids. The Lobby scene was shot with 1350 frames at resolution 320×240, and the Kids scene was shot with 1463 frames at resolution 352×288. Here, the Kids scene had more detail, and as such was more difficult to compress than the Lobby scene.

The objective peak signal-to-noise ratio (PSNR) is measured between the original COM scene and the decompressed scene:

$$PNSR = 10 \log_{10} \frac{255^2}{\frac{1}{N \cdot W \cdot H} \sum [c(n, w, h) - c'(n, w, h)]^2}$$

where $c(n,w,h)$ and $c'(n,w,h)$ are the original and reconstructed COM scenes, respectively.

The concentric mosaics scenes were compressed in color, however, only the PSNR of the luminance (Y) component is reported, as the compressed bitstream of the Y component consists of around 90% of the entire compressed bitstream. The Lobby scene was compressed at a ratio of 120:1 and 60:1, and the Kids scene was compressed at a ratio of 100:1, 60:1 and 40:1, respectively. In the simulations, rate control in RBC compression was not implemented, i.e., the quantization scale $Q_a$ and $Q_p$ is the same throughout the compression. While in MPEG-2, the rate control is turned on in order to get the best performance. The two-level index table of RBC is counted in the comparison, thus the resulting bitstream of the exemplary RBC scheme bears the property of random access, but that of the MPEG-2 does not.

Some of the results are listed in table 500 of FIG. 8. Here, it can be observed that RBC beats MPEG-2 by about 0.5 to 1.7 dB, with an average gain of about 1.1 dB. Considering that MPEG-2 is a highly optimized coder, this gain is significant.

The rendered Kids scene compressed at ratio 40:1 and 100:1. At a compression ratio 40:1, the rendered Kids scene shows very little distortion. Artifacts such as ringing and blur started showing up when the compression ratio was raised to about 100:1, however, the quality of the rendered view was still deemed fairly good.

In a second experiment, the rendering speed of an exemplary RBC scheme was investigated. The comparison codec was the VQ used in Shum et al., supra, with a compression ratio of 12:1. The comparison was made by simply replacing the VQ codec with an RBC codec. The test scene was the Kids scene. The compression ratio of the RBC codec was 60:1, i.e., five times that of the VQ codec. Thus, the bitstream cache size was 7.2 megabytes, and the slit, A and P frame cache are 1.7, 3.6 and 5.3 megabytes, respectively, according to the discussion in the last section. The VQ codec, which must load the entire compressed file into the memory, required a memory cache of 35.3 megabytes.

Figure 7:
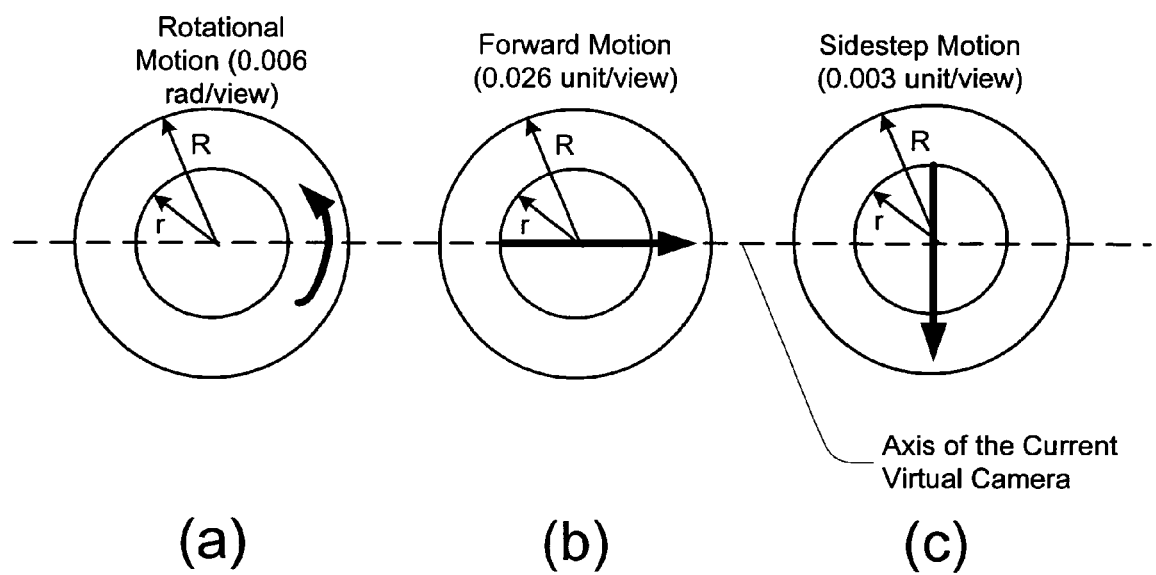
FIGS. 7a–c are diagrams that illustratively depict three exemplary types of motion that may occur during the selective navigation of a rendered concentric mosaic image scene, namely, rotational motion, forward motion and side-step motion, in accordance with certain exemplary implementations of the present invention.

The experimental platform was a Pentium II PC running at 400 MHz with a system memory large enough to accommodate all the caches. The rendering engine used both point sampling and bilinear interpolation. Three motion passes of the viewer were simulated, i.e., rotation, forward, and sidestep modes, as shown in FIGS. 7a–c, respectively. In the rotation mode, the viewer stays at the center of the circle and rotate 0.006 radians per view. Altogether one thousand views were rendered to get the average frame rate. In the forward mode, the viewer starts at the center and moves forward along the optical axis of the camera. A total of five hundred views were rendered. In the sidestep case, the viewer moves sidestep perpendicular to the optical axis of the camera. Here, a total of two hundred views were rendered. Sidestep movement appears to be the most time-consuming during rendering, as it tends to generate more new slits or cache misses. The average numbers of frames rendered per second are shown in table 520 in FIG. 9. Note that two rendering frame sizes, i.e., 352×168 pixels and 800×372 pixels were tested.

Due to higher complexity in decoding, the rendering speed of the RBC was, in these experiments a little slower than VQ, especially in the sidestep example. However, the frame rate difference between RBC and VQ was not much, while the compression ratio of RBC is 5 times as much as that of VQ. The rendered concentric mosaics work comfortably and appear smoothly under RBC.

In this example, an RBC codec was profiled, and the most time-consuming components of RBC process appear to be the motion compensation, inverse DCT, YUV to RGB color transform and rendering processes. It is noted, however, that the first three of these processed may be further accelerated if MMX instruction sets or the like are used.

Hence, a new approach for the compression and just-in-time (JTT) rendering of the concentric mosaic scenery named reference block coding (RBC) has been so-far presented herein. The resulting methods and arrangements not only outperform the video coding standard MPEG-2 in compression efficiency, but also offer the capability to randomly access the compressed bitstream. Moreover, experiments have shown that the rendering speed of RBC is fast enough for real time rendering of compressed concentric mosaic scenes.

6. Virtual Media (Vmedia) Access Protocol and Vmedia Concentric Mosaic Browser The bitstream of the compressed concentric mosaics can, for example, be advantageously delivered over a network(s) using a virtual media (Vmedia) access protocol or other like protocol.

Vmedia is a multimedia communication protocol in a server-client environment. An exemplary configuration 600 of a Vmedia server component and a Vmedia client component is depicted in the block diagram of FIG. 10.

The following description will focus more on the activity of the Vmedia client, as most Vmedia functionalities are implemented at the client. One important feature of the Vmedia protocol is to handle the access, cache and delivery of media segments with importance and priority over the interconnecting network(s). Through the Vmedia application-programming interface (API) 610, a remote media file 602 is made to appear as a virtual local file, which can be accessed with interfaces very similar to the file operating routines, such as fopen, fread, etc.

Figure 10:
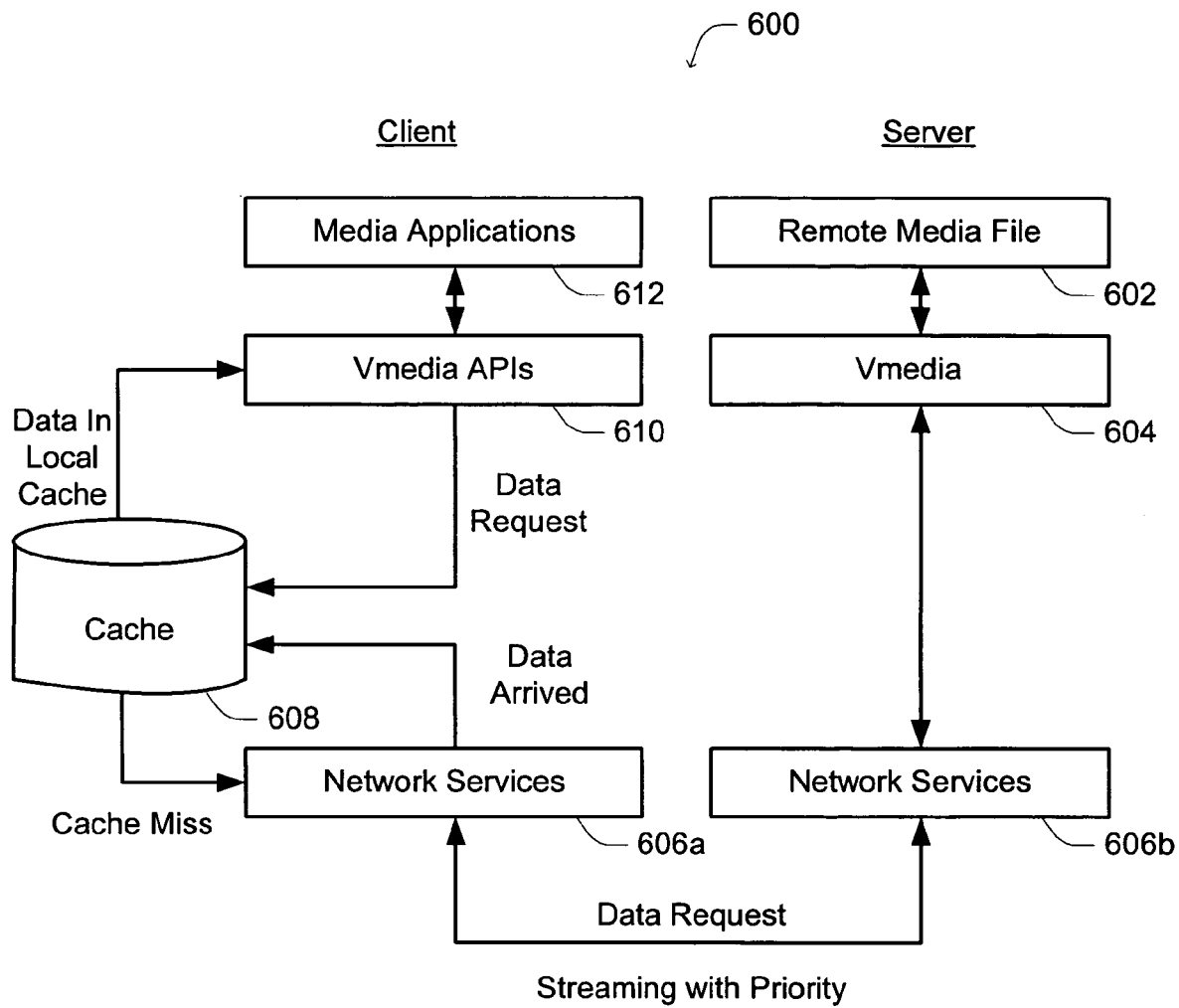
FIG. 10 is a block diagram depicting methods and arrangements for selectively transporting all or portions of a bitstream carrying encoded/compressed anchor and predicted portions of the concentric mosaic image data through a networked communication environment, in accordance with certain exemplary implementations of the present invention.

With this in mind, the workflow of bitstream delivery with the Vmedia protocol is shown in FIG. 10. In a connection phase, file header 320 is delivered using a synchronous mode, in which the Vmedia protocol does not return the control until file header 320 is successfully delivered from the server to the client, e.g., via network services 606a–b and the interconnecting network(s).

Following this initial connection phase, the Vmedia client manages the remote compressed bitstream as a virtual local file through a Vmedia cache 608. At first, Vmedia cache 608 is empty except for file header 320, which was delivered in the connection phase. As the user wanders around (e.g., selectively), more and more of the compressed bitstream arrives, and Vmedia cache 608 is gradually filled. If remote media file 602 is larger than the memory allocated to Vmedia cache 608 and all available cache memory is exhausted, then bitstream segments that are less important and are used less frequently can be dropped or copied to the hard disk, for example, when new bitstream segments arrive.

Whenever the bitstream segment of an A or P frame MBG is accessed, Vmedia API 610 first checks whether the segment is available in Vmedia cache 608. If the bitstream segment is available, it is returned to the media application 612 (e.g., a Vmedia browser) immediately. In case of a cache miss, i.e., the requested bitstream segment is unavailable; a network request is generated by Vmedia API 610 and passed through network services 606a–b to stream the missing segment(s) over the network(s). In either case, the Vmedia protocol works in the asynchronous mode, in which the control is returned immediately to the calling application regardless of the availability of the accessed bitstream segment. It is thusly the responsibility of the calling application to be aware that not all media segments are accessible immediately, and to render a view of the current scene on a "best effort" basis.

A bitstream segment is accessed with the priority and importance specified by the calling application. For example, in certain exemplary Vmedia concentric mosaic browsers, the bitstream segments of A frame MBGs are accessed with a higher priority value than those of P frame MBGs, so that they are delivered earlier over the network(s). The A frame MBGs are also assigned a higher importance value than the P frame MBGs, so they are less likely to be dropped when the cache memory is tight.

File header 320 is preferably assigned the highest importance value and will never be dropped out of cache 608. Vmedia does not necessarily send A or P frame MBG bitstream requests immediately over the network(s) upon receipt, since there may be higher priority request later, and the network(s) overhead of small requests may be too heavy. Instead, after a view is rendered and all A and P frame MBG requests are generated, Vmedia sorts and sends all the requests according to their priority. Thus, multiple bitstream segment requests may be bundled into a larger request packet to save network overhead.

In this example, the Vmedia server then processes the requests on the order received, because the Vmedia client has already sorted them. Again, multiple returned bitstream segments can be bundled into a larger data packet, and sent back to the media application 612.

Figure 11:
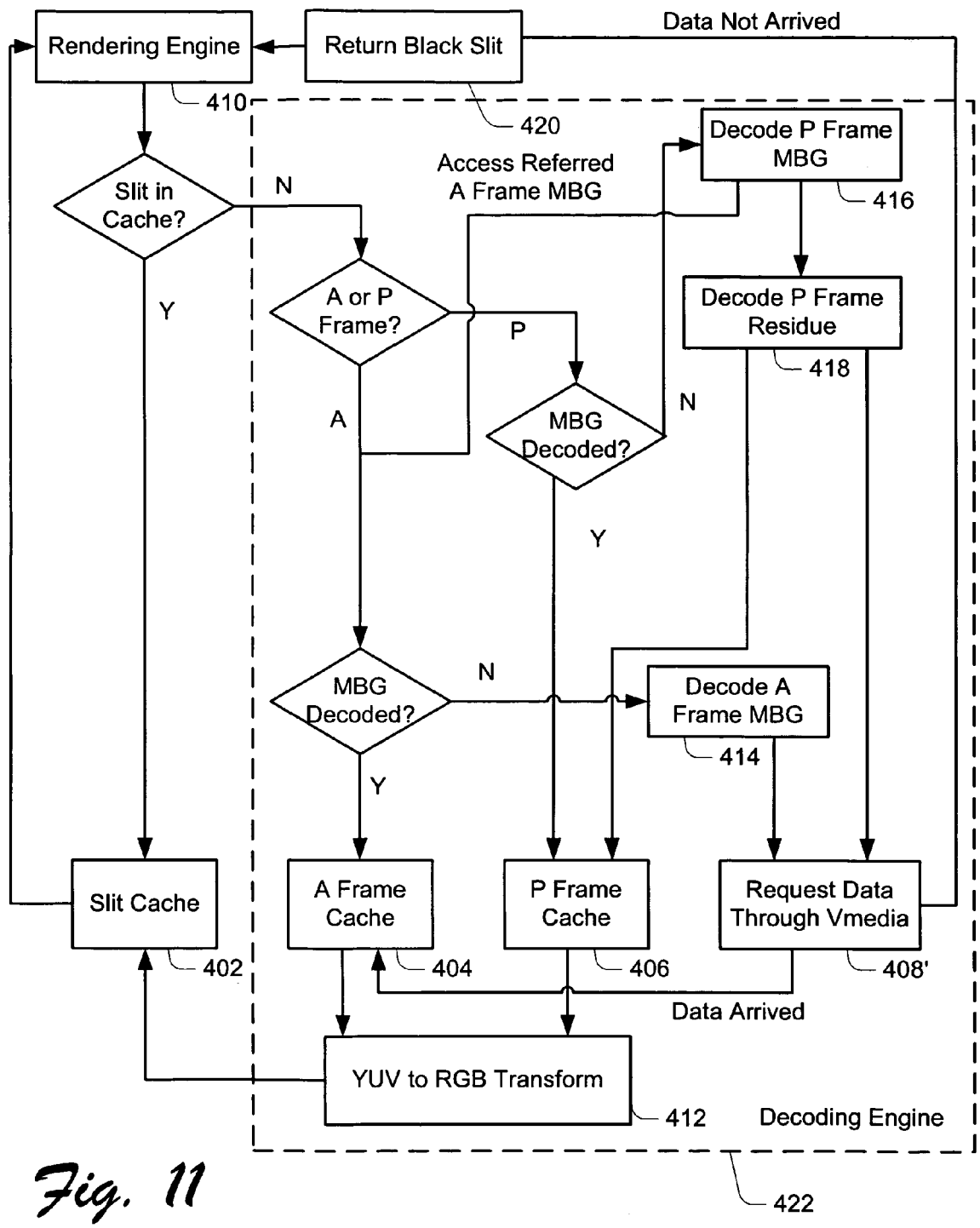
FIG. 11 is a block diagram, similar to that in FIG. 6, but further incorporating methods and arrangements for selectively transporting all or portions of a bitstream carrying encoded/compressed anchor and predicted portions of the concentric mosaic image data through a networked communication environment, in accordance with certain further exemplary implementations of the present invention.

With this in mind, a workflow of an exemplary Vmedia concentric mosaic browser is illustrated in FIG. 11, which is similar to the decoder process 400 as depicted in the block diagram in FIG. 6.

Here, again, a plurality of caches is used extensively to speed up the rendering process. As mentioned previously, one important feature in designing these caches is to balance between the computation load and memory consumption.

As before, there are four caches: slit cache 402 which holds the vertical slits to be rendered (in RGB space), the A and P frame caches, 404 and 406, respectively, which hold the A and P frame MBGs (in YUV space), and a Vmedia cache 408' which holds the compressed bitstream segments.

During the rendering of a view of the environment, rendering engine 410 accesses the vertical slit first from slit cache 402. If the slit is not in slit cache 402, it will be further accessed from the applicable A or the P frame cache 404 or 406, depending on which frame the slit is located.

If the MBG containing the slit is located in cache, the slit is copied by the frame cache, converted from YUV to RGB space, and then put in slit cache 402. Otherwise, the corresponding MBG bitstream is located via the two-level index table 314 (see FIG. 5) and accessed through Vmedia API 610 (see FIG. 10).

If the bitstream is available, it is decoded and the resultant MBG is put into A frame cache 404. Otherwise, a request is generated by Vmedia API 610 to deliver the bitstream segment of the accessed MBG over the network(s).

To decode a P frame MBG, both the prediction residue of that MBG and all the referred A frame MBGs are needed. The referred A frame MBGs are accessed from A frame cache 404 as described above. The compressed bitstream of the prediction residue is also located via two-level index table 314 and accessed through Vmedia API 610.

If the bitstream segment is available, the prediction residue is decoded and added to the referred A frame MBG to recover the P frame MBGs. If the bitstream segment is not available, Vmedia API 610 generates another request.

At the end of frame rendering, Vmedia prioritizes all requests, bundles them, and sends them to the Vmedia server, which sends back the requested bitstream segments.

The above task of rendering, slit accessing, MBG decoding, bitstream segment accessing is repeatedly performed by the Vmedia concentric mosaic browser. In each step of the iteration, the browser renders a current view with a best effort based on the available bitstream segments. At first, none of the bitstream segments is available, and a blank view is rendered. When some bitstream segments arrive, the corresponding A or P frame MBGs are decoded (by decoder engine 422), and slits in the MBGs are rendered (by rendering engine 410) in the view. The slits that are unavailable are still rendered as blank. As more and more bitstream segments arrive, the blank area(s) becomes smaller and smaller, and the quality of the view gradually improves.

The bitstream segment can be managed by the Vmedia cache 408 through the aid of a hit count and importance tag, for example. As before, slit, A and P frame caches (402, 404 and 406) are preferably managed using a FIFO cache management strategy.

An exemplary Vmedia concentric mosaic browser for wandering in a realistic environment over the Internet has been developed. The Vmedia browser can take the form of an ActiveX plug-in and embedded in a web page, for example. Alternatively, it can run as an independent media application. With the browser, the user may wander freely or selectively in a realistic environment over a network environment, rotate, walk forward/backward and sidestep, and observe views of the environment as though one is actually there.

In certain further experiments/simulations, the concentric mosaic Lobby scene was embedded in a web page. It is compressed using RBC with a compression ratio of about 120:1, and the compressed bitstream was about 2.5 megabytes in size. The file header of the bitstream included a small information header, a compressed thumbnail view of the environment (about 4.6 kilobytes), the global translation vectors and the two-level hierarchical index table (about 40 kilobytes). The entire file header occupied a total of about 45 kilobytes. An ActiveX Vmedia concentric mosaic viewer was then used to access the compressed concentric mosaic through an Internet-like environment. For this test the connection speed was about 33.6 kbps.

During the connection phase, the information header and the thumbnail were downloaded from the Vmedia server. This took around 2 seconds. The thumbnail was then displayed in the browser window to give the user an impression of the Lobby scene environment.

The user could then begin an entry of the scene by selectively pointing to and double-clicking on a region of interest. The rest of the file header, e.g., the global translation vectors and the two-level index table, was then downloaded from the Vmedia server in a synchronous mode. This took about 10 seconds. After that, the current view was rendered according to the position of the viewpoint and viewing directions. A set of slits necessary to render the current view was accessed from slit cache 402, which in turn accessed MBGs in the A or P frame caches 404 and 406, respectively, and further accessed bitstream segments from the Vmedia API 610.

Only the bitstream segments necessary to decode the slits used in the novel view were accessed and decoded. This greatly improves the response time that a view is rendered. Typically, in the BI mode, about 30 to about 100 kilobytes of compressed bitstream segments are accessed to decode a novel view. Hence, under a network bandwidth of about 33.6 kbps, the view can be rendered in about 7 to about 25 seconds. Faster times would obviously be expected for higher bandwidth connections.

To render a view during the wandering, i.e., rotate, walk forward/backward and sidestep, the unavailable bitstream segments were only about half that amount, i.e., about 15 to about 50 kilobytes, since the rest of the bitstream segments have already been delivered in the previous view. In this experiment, a new view would usually be completely rendered within about 5 seconds.

Rendering in the PS mode will not save too much requested data amount, as slits are grouped into MBGs and are streamed together. This exemplary browser rendered the slits that are unavailable as black. To provide additional user feedback, a progress/status readout was also displayed for the user, for example, as the ratio of the arrived bitstream segments versus the total bitstream segments required for the current view. The size of the unavailable bitstream segments in kilobytes was also shown.

In other experiments, the Lobby scene was compressed with a compression ratio of 200:1. Here, the compressed bitstream was further reduced to about 1.5 mega-bytes. The file header became smaller, too. The thumbnail took up about 3.5 kilobytes, and the index table required about 35 kilobytes. A novel view required about 15 to 40 kilobytes. The response time of the browser significantly improved, although the end view is a little more blurred. The user could freely wander in the environment, rotate, walk forward/backward or sidestep as he/she wishes. The browser quickly responded to the request of the user, and renders the views that are actually seen in the real environment. Accordingly, a relatively pleasant remote virtual environment experience was provided; even when the bandwidth is as low as about 33.6 kbps.

Thus, as described herein, methods and arrangements have been developed that enable a user to wander in a realistic environment over a networked environment. A scene is captured as concentric mosaics, compressed via the reference block codec (RBC), and accessed and delivered over the network(s) through a virtual media (Vmedia) access protocol or other like protocol. For the first time, the user has been able to selectively, freely wander in a realistic environment over a network bandwidth as low as about 33.6 kbps.

The above-described exemplary Vmedia concentric mosaic browser may be further improved by encoding each macroblock group (MBG) progressively. Thus, for example, at the rendering time, one may start by delivering the bitstream segments of the first quality layer, and then those of the second and third quality layer. With such a strategy, a coarse quality view can be quickly rendered, and be refined as more and more bitstream segments arrive. Technologies developed in video error concealment can also be employed to render the unavailable slit by interpolating neighbor available slits. For example, see, Wang et al., "Error Control and Concealment For Video Communication: A Review", Proceedings of the IEEE, PP. 974–997, Vol. 86, No. 5, May 1998.

Additionally, the user movement, which is currently restricted in a circle of the concentric mosaics, may be further enhanced by concatenating several concentric mosaics together to form a larger scene.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
    compressing concentric mosaic image data having a plurality of frames, the compressing comprising:
        selectively dividing the plurality of frames into a plurality of anchor frames and a plurality of predicted frames;
        independently encoding each of the anchor frames; and
        encoding a prediction residue for each of the predicted frames, the prediction residue for each of the predicted frames being determined by referring each of the predicted frames to at least one of the anchor frames.

2. The method as recited in claim 1, wherein independently encoding each of the anchor frames further includes:
   segmenting each of the anchor frames into a plurality of anchor frame macroblocks; and
   independently encoding each of the anchor frame macroblocks.

3. The method as recited in claim 2, wherein independently encoding each of the anchor frame macroblocks further includes:
   subdividing each anchor frame macroblock into a plurality of subblocks;
   transforming each subblock by a discrete cosine transform (DCT); and
   entropy encoding each transformed subblock using a Huffman coder.

4. The method as recited in claim 3, wherein subdividing each anchor frame macroblock into the plurality of subblocks further includes subdividing each anchor frame macroblock into at least one chrominance subblock and at least one luminance subblock.

5. The method as recited in claim 3, wherein the discrete cosine transform (DCT) includes a basis-8 DCT and quantization of DCT coefficients by a quantization scale associated with the plurality of anchor frames.

6. The method as recited in claim 1, wherein encoding the prediction residue for each of the predicted frames further includes:
   segmenting the at least one anchored frame into a plurality of anchor frame macroblocks;
   segmenting each of the predicted frames into a plurality of predicted frame macroblocks; and
   encoding each of the predicted frame macroblocks using motion compensation.

7. The method as recited in claim 6, wherein encoding each of the predicted frame macroblocks using motion compensation further includes:
   for each predicted frame macroblock, selectively determining a significantly best match within one or more anchor frame macroblocks;
   determining a reference vector for each predicted frame macroblock within each predicted frame, the reference vector indicating a position of the significantly best match within the one or more anchor frame macroblocks;
   for each predicted frame macroblock, determining a prediction residue for the predicted frame macroblock by the difference between a predicted frame macroblock value and an anchor frame match value.

8. The method as recited in claim 7, wherein encoding each of the predicted frame macroblocks using motion compensation farther includes decoding each of the encoded anchor frames.

9. The method as recited in claim 7, wherein determining the prediction residue for the predicted frame macroblock further includes:
   for each predicted frame macroblock, transforming residue by a discrete cosine transform (DCT); and
   entropy encoding each transformed residue using a Huffman coder.

10. The method as recited in claim 9, wherein the discrete cosine transform (DCT) includes a basis-8 DCT and quantization of DCT coefficients by a quantization scale associated with the plurality of predicted frames.

11. The method as recited in claim 9, wherein encoding each of the predicted frame macroblocks using motion compensation further includes using a translation-based motion model.

12. The method as recited in claim 9, wherein encoding each of the predicted frame macroblocks using motion compensation further includes using an affine motion model.

13. The method as recited in claim 9, wherein encoding each of the predicted frame macroblocks using motion compensation further includes using a perspective motion model.

14. The method as recited in claim 1, further comprising outputting a bitstream having encoded anchor frame data, encoded predicted frame data, and indexing data.

15. The method as recited in claim 1, further comprising outputting a bitstream having encoded anchor frame data associated with an anchor frame macroblock group (MBG) and corresponding indexing data.

16. The method as recited in claim 14, further comprising outputting a bitstream that includes a thumbnail image of at least a portion of the concentric mosaic data.

17. The method as recited in claim 14, wherein the bitstream further includes quantization scale information.

18. The method as recited in claim 14, wherein the encoded predicted frame data includes encoded prediction residue.

19. The method as recited in claim 14, wherein the indexing data is configured to identify each encoded anchor frame and each encoded predicted frame.

20. The method as recited in claim 19, wherein the encoded anchor frame data is further configured to identify encoded macroblock groups (MBGs) within each encoded anchor frame.

21. The method as recited in claim 19, wherein the encoded predicted frame data is further configured to identify encoded predicted frame macroblocks within each encoded predicted frame.

22. The method as recited in claim 19, wherein the encoded predicted frame data is further configured to identify encoded predicted frame macroblock groups (MBGs) within each encoded predicted frame.

23. A computer-readable medium having computer-executable instructions that, when executed, perform acts comprising:
   compressing concentric mosaic image data having a plurality of frames by:
      selectively dividing the plurality of frames into a plurality of anchor frames and a plurality of predicted frames;
      independently encoding each of the anchor frames; and
      encoding a prediction residue for each of the predicted frames, the prediction residue for each of the predicted frames being determined by referring each of the predicted frames to at least one of the anchor frames.

24. The computer-readable medium as recited in claim 23, wherein independently encoding each of the anchor frames further includes:
   segmenting each of the anchor frames into a plurality of anchor frame macroblocks; and
   independently encoding each of the anchor frame macroblocks.

25. The computer-readable medium as recited in claim 24, wherein independently encoding each of the anchor frame macroblocks further includes:
   subdividing each anchor frame macroblock into a plurality of subblocks;

transforming each subblock by a discrete cosine transform (DCT); and entropy encoding each transformed subblock using a Huffman coder.

26. The computer-readable medium as recited in claim 25, wherein subdividing each anchor frame macroblock into the plurality of subblocks further includes subdividing each anchor frame macroblock into at least one chrominance subblock and at least one luminance subblock.

27. The computer-readable medium as recited in claim 25, wherein the discrete cosine transform (DCT) includes a basis-8 DCT and quantization of DCT coefficients by a quantization scale associated with the plurality of anchor frames.

28. The method as recited in claim 23, wherein encoding the prediction residue for each of the predicted frames further includes:

segmenting the at least one anchored frame into a plurality of anchor frame macroblocks;

segmenting each of the predicted frames into a plurality of predicted frame macroblocks; and encoding each of the predicted frame macroblocks using motion compensation.

29. The computer-readable medium as recited in claim 28, wherein encoding each of the predicted frame macroblocks using motion compensation further includes:

for each predicted frame macroblock, selectively determining a significantly best match within one or more anchor frame macroblocks;

determining a reference vector for each predicted frame macroblock within each predicted frame, the reference vector indicating a position of the significantly best match within the one or more anchor frame macroblocks;

for each predicted frame macroblock, determining a prediction residue for the predicted frame macroblock by the difference between a predicted frame macroblock value and an anchor frame macroblock value.

30. The computer-readable medium as recited in claim 29, wherein encoding each of the predicted frame macroblocks using motion compensation further includes decoding each of the encoded anchor frames.

31. The computer-readable medium as recited in claim 29, wherein determining the prediction residue for the predicted frame macroblock further includes:

for each predicted frame macroblock, transforming residue by a discrete cosine transform (DCT); and entropy encoding each transformed residue using a Huffman coder.

32. The computer-readable medium as recited in claim 31, wherein the discrete cosine transform (DCT) includes a basis-8 DCT and quantization of DCT coefficients by a quantization scale associated with the plurality of predicted frames.

33. The computer-readable medium as recited in claim 31, wherein encoding each of the predicted frame macroblocks using motion compensation further includes using a translation-based motion model.

34. The computer-readable medium as recited in claim 23, wherein the computer-executable instructions further include the step of outputting a bitstream comprising encoded anchor frame data, encoded predicted frame data, and indexing data.

35. The computer-readable medium as recited in claim 34, wherein the bitstream further includes quantization scale information.

36. The computer-readable medium as recited in claim 34, wherein the encoded predicted frame data includes encoded prediction residue.

37. The computer-readable medium as recited in claim 35, wherein the indexing data is configured to identify each encoded anchor frame and each encoded predicted frame.

38. The computer-readable medium as recited in claim 37, wherein the encoded anchor frame data is further configured to identify encoded anchor frame macroblock groups (MBGs) within each encoded anchor frame.

39. The computer-readable medium as recited in claim 37, wherein the encoded predicted frame data is further configured to identify encoded predicted frame macroblock groups (MBGs) within each encoded predicted frame.

40. An apparatus comprising:

memory suitable for storing concentric mosaic image data having a plurality of frames;

logic operatively coupled to the memory and configured to selectively divide the plurality of frames into a plurality of anchor frames and a plurality of predicted frames, independently encode each of the anchor frames, and encode a prediction residue for each of the predicted frames, the prediction residue for each of the predicted frames being determined by referring each of the predicted frames to at least one of the anchor frames.

41. The apparatus as recited in claim 40, wherein the logic is further configured to segment each of the anchor frames into a plurality of anchor frame macroblocks and independently encode each of the anchor frame macroblocks.

42. The apparatus as recited in claim 41, wherein the logic is further configured to subdivide each anchor frame macroblock into a plurality of subblocks, transform each subblock by a discrete cosine transform (DCT), and entropy encode each transformed subblock using a Huffman coder.

43. The apparatus as recited in claim 42, wherein the logic is further configured to subdivide each anchor frame macroblock into at least one chrominance subblock and at least one luminance subblock.

44. The apparatus as recited in claim 42, wherein the discrete cosine transform (DCT) includes a basis-8 DCT and quantization of DCT coefficients by a quantization scale associated with the plurality of anchor frames.

45. The apparatus as recited in claim 40, wherein the logic is further configured to segment the at least one anchored frame into a plurality of anchor frame macroblocks, segment each of the predicted frames into a plurality of predicted frame macroblocks, and encode each of the predicted frame macroblocks using motion compensation.

46. The apparatus as recited in claim 45, wherein the logic is further configured to encode each of the predicted frame macroblocks using motion compensation by, for each predicted frame macroblock, selectively determining a significantly best match within one or more anchor frame macroblocks, determining a reference vector for each predicted frame macroblock within each predicted frame, the reference vector indicating a position of the significantly best match within the one or more anchor frame macroblocks, and for each predicted frame macroblock, determining a prediction residue for the predicted frame macroblock by the difference between a predicted frame macroblock value and an anchor frame macroblock value.

47. The apparatus as recited in claim 46, wherein the logic is further configured to encode each of the predicted frame macroblocks using motion compensation by first decoding each of the associated encoded anchor frames.

48. The apparatus as recited in claim 47, wherein the logic is further configured to, for each predicted frame macroblock, transform residue by a discrete cosine transform (DCT), and entropy encode each transformed residue using a Huffman coder.

49. The apparatus as recited in claim 48, wherein the discrete cosine transform (DCT) includes a basis-8 DCT and quantization of DCT coefficients by a quantization scale associated with the plurality of predicted frames.

50. The apparatus as recited in claim 48, wherein the logic is further configured to use a translation-based motion model to encode each of the predicted frame macroblocks using motion compensation.

51. The apparatus as recited in claim 40, wherein the logic is further configured to output a bitstream comprising encoded anchor frame data, encoded predicted frame data, and indexing data.

52. The apparatus as recited in claim 51, wherein the bitstream further includes quantization scale information.

53. The apparatus as recited in claim 51, wherein the encoded predicted frame data includes encoded prediction residue.

54. The apparatus as recited in claim 51, wherein the indexing data is configured to identify each encoded anchor frame and each encoded predicted frame.

55. The apparatus as recited in claim 54, wherein the encoded anchor frame data is further configured to identify encoded anchor frame macroblock groups (MBGs) within each encoded anchor frame.

56. The apparatus as recited in claim 54, wherein the encoded predicted frame data is further configured to identify encoded predicted frame macroblock groups (MBGs) within each encoded predicted frame.

57. A method comprising:
  decompressing a bitstream having encoded anchor frame data, encoded predicted frame data, and indexing data associated with compressed concentric mosaic image data having a plurality of frames, said decompressing comprising:
  accessing the index data to identify:
    a unique location for each encoded anchor frame within the encoded anchor frame data and from each encoded anchor frame each encoded anchor frame macroblock group (MBG) therein, and
    a unique location for each encoded predicted frame within the encoded predicted frame data and from each encoded predicted frame each encoded predicted frame macroblock group (MBG) therein; and
  for each new view to be rendered;
    determining which encoded anchor frame MBGs and encoded predicted frame MBGs are to be used in rendering the new view;
    selectively decoding the encoded anchor frame MBG to be used in a rendering the new view; and
    selectively decoding the predicted frame MBG using all referenced decoded anchor frame MBGs for the predicted frame MBG.

58. The method as recited in claim 57, wherein selectively decoding the encoded anchor frame MBG to be used in rendering the new view further includes:
  for each encoded anchor frame MBG to be used in rendering the new view, determining:
    if the encoded anchor frame MBG has an existing corresponding decoded anchor frame MBG, and if so, using the existing corresponding decoded anchor frame MBG in rendering the new view, otherwise, decoding the encoded anchor frame MBG to be used in rendering the new view.

59. The method as recited in claim 57, wherein selectively decoding the predicted frame MBG using all referenced decoded anchor frame MBGs for the predicted frame MBG further includes:
  for each encoded predicted frame MBG to be used in rendering the new view, determining:
    if the encoded predicted frame MBG has an existing corresponding decoded predicted frame MBG, and if so, using the existing corresponding decoded predicted frame MBG in rendering the new view, otherwise
    decoding the predicted frame MBG using all referenced decoded anchor frame MBGs for the predicted frame MBG.

60. The method as recited in claim 57, wherein each encoded predicted frame includes a prediction residue associated with at least one referenced anchor frame.

61. The method as recited in claim 57, wherein decoding the encoded anchor frame macroblock to be used in rendering the new view further includes using an inverse discrete cosine transform (DCT).

62. The method as recited in claim 61, wherein the inverse discrete cosine transform (DCT) includes an inverse quantization of DCT coefficients by a quantization scale associated with the plurality of predicted frames and an inverse basis-8 DCT.

63. The method as recited in claim 57, wherein the bitstream further includes quantization scale information.

64. The method as recited in claim 57, wherein decoding the predicted frame MBG using all referenced decoded anchor frame MBGs for the predicted frame MBG further includes:
  decoding each referenced encoded anchor frame MBG for which there is no existing corresponding decoded anchor frame MBG; and
  decoding the predicted frame MBG using motion compensation using a prediction residue.

65. The method as recited in claim 57, wherein selectively decoding the encoded anchor frame MBG to be used in rendering the new view further includes storing the decoded anchor frame MBG in a first memory cache.

66. The method as recited in claim 65, wherein selectively decoding the predicted frame MBG the referenced decoded anchor frame MBGs for the predicted frame MBG further includes storing the decoded predicted frame MBG in a second memory cache.

67. The method as recited in claim 57, further comprising rendering the new view on at least one output device.

68. An apparatus comprising:
  memory suitable for storing at least a portion of a bitstream having encoded anchor frame data, encoded predicted frame data, and indexing data associated with a compressed concentric mosaic image data having a plurality of frames; and
  logic operatively coupled to the memory, the logic including:
    a rendering engine configured to access the index data to identify a unique location for each encoded anchor frame within the encoded anchor frame data and from each encoded anchor frame each encoded anchor frame MBG therein, and is further configured to access the index data to identify a unique location for each encoded predicted frame within the encoded predicted frame data and from each encoded predicted frame each encoded predicted frame MBG therein, and a decoding engine that, for each new view to be rendered, determines which encoded anchor frame MBGs and encoded predicted frame MBGs are to be used in rendering the new view, selectively decodes the encoded anchor frame MBG to be used in rendering the new view, and selectively decodes the predicted frame MBG using all referenced decoded anchor frame MBGs for the predicted frame MBG.

69. The apparatus as recited in claim 68, wherein the decoder engine is further configured to selectively decode the encoded anchor frame MBG to be used in rendering the new view by, for each encoded anchor frame MBG to be used in rendering the new view, determining if the encoded anchor frame MBG has an existing corresponding decoded anchor frame MBG in the memory, and if so, allowing the rendering engine to use the existing corresponding decoded anchor frame MBG in rendering the new view, otherwise, decoding the encoded anchor frame MBG to be used in rendering the new view and storing the resulting decoded anchor frame MBG to the memory.

70. The apparatus as recited in claim 68, wherein the decoder engine is further configured to selectively decode the predicted frame MBG using a decoded anchor frame MBG associated with the predicted frame MBG by, for each encoded predicted frame MBG to be used in rendering the new view, determining if the encoded predicted frame MBG has an existing corresponding decoded predicted frame MBG in the memory, and if so, allowing the rendering engine to use the existing corresponding decoded predicted frame MBG in rendering the new view, otherwise decoding the predicted frame MBG using the referenced decoded anchor frame MBG associated with the predicted frame MBG and storing the resulting decoded predicted frame MBG to the memory.

71. The apparatus as recited in claim 68, wherein each encoded predicted frame includes a prediction residue associated with at least one referenced anchor frame.

72. The apparatus as recited in claim 68, wherein the decoder engine is further configured to decode the encoded anchor frame macroblock to be used in rendering the new view using an inverse discrete cosine transform (DCT).

73. The apparatus as recited in claim 72, wherein the inverse discrete cosine transform (DCT) includes an inverse quantization of DCT coefficients by a quantization scale associated with the plurality of predicted frames and basis-8 inverse DCT.

74. The apparatus as recited in claim 68, wherein the bitstream further includes quantization scale information.

75. The apparatus as recited in claim 68, wherein the decoder engine is further configured to decode the predicted frame MBG using the referenced decoded anchor frame MBG for the predicted frame MBG by:

decoding the referenced encoded anchor frame MBG for which there is no existing corresponding decoded anchor frame MBG and storing the resulting decoded anchor frame MBG to the memory; and decoding the predicted frame MBG using motion compensation and a prediction residue.

76. The apparatus as recited in claim 68, further comprising at least one output device operatively coupled to the rendering engine, and wherein the rendering engine is further configured to cause the new view to be provided to the output device.

* * * * *

UNITED STATES PATENT AND TRADEMARK OFFICE
CERTIFICATE OF CORRECTION

PATENT NO. : 6,993,074 B2
APPLICATION NO. : 09/812713
DATED : January 31, 2006
INVENTOR(S) : Cha Zhang et al.

It is certified that error appears in the above-identified patent and that said Letters Patent is hereby corrected as shown below:

On the face page, in field (56), under "Other Publications", in column 2, line 2, delete "Mosiacs" and insert -- Mosaics --, therefor.

On page 2, in field (56), under "Other Publications", in column 1, line 1, delete "et al," and insert -- et al., --, therefor.

In column 4, line 4, delete "Pat," and insert -- Pat. --, therefor.

In column 10, line 54, delete "Qp" and insert -- $Q_p$ --, therefor.

In column 17, line 2, delete "408" and insert -- 408' --, therefor.

In column 19, line 55, in Claim 8, delete "farther" and insert -- further --, therefor.

In column 23, line 50, in Claim 57, after "rendered" delete ";" and insert -- : --, therefor.

In column 23, line 55, in Claim 57, after "in" delete "a".

Signed and Sealed this

Eighteenth Day of August, 2009

David J. Kappos
*Director of the United States Patent and Trademark Office*